(12) United States Patent
Harrison et al.

(10) Patent No.: US 12,434,379 B2
(45) Date of Patent: Oct. 7, 2025

(54) CONNECTION PLATE

(71) Applicant: ROLLS-ROYCE PLC, London (GB)

(72) Inventors: Liam D Harrison, Derby (GB); Ian Kennedy, Derby (GB); Thomas Hopper, Derby (GB); Andrew D Norton, Derby (GB)

(73) Assignee: ROLLS-ROYCE plc, London (GB)

( * ) Notice: Subject to any disclaimer, the term of this patent is extended or adjusted under 35 U.S.C. 154(b) by 63 days.

(21) Appl. No.: 18/384,081

(22) Filed: Oct. 26, 2023

(65) Prior Publication Data
US 2024/0165794 A1 May 23, 2024

(30) Foreign Application Priority Data
Nov. 22, 2022 (GB) ..................................... 2217437

(51) Int. Cl.
*B25J 9/06* (2006.01)
*B25J 9/10* (2006.01)
*B25J 18/06* (2006.01)
*B25J 19/00* (2006.01)

(52) U.S. Cl.
CPC ............. *B25J 9/065* (2013.01); *B25J 9/1045* (2013.01); *B25J 18/06* (2013.01); *B25J 19/0004* (2013.01)

(58) Field of Classification Search
CPC . B25J 9/065; B25J 9/1045; B25J 18/06; B25J 19/0004
See application file for complete search history.

(56) References Cited

U.S. PATENT DOCUMENTS

| 8,602,031 B2 | 12/2013 | Reis et al. |
| 2001/0031983 A1* | 10/2001 | Brock ................... A61B 34/71 606/205 |
| 2002/0087169 A1 | 7/2002 | Brock et al. |
| 2011/0146441 A1 | 6/2011 | Graham et al. |
| 2011/0213383 A1 | 9/2011 | Lee et al. |
| 2016/0302874 A1 | 10/2016 | Wehrheim et al. |
| 2017/0014998 A1 | 1/2017 | Langenfeld et al. |

(Continued)

FOREIGN PATENT DOCUMENTS

| CN | 109623803 A | 4/2019 |
| CN | 114851180 A | 8/2022 |

(Continued)

OTHER PUBLICATIONS

May 23, 2023 Search Report issued in British Patent Application No. 2217436.1.

(Continued)

*Primary Examiner* — Terence Boes
(74) *Attorney, Agent, or Firm* — Oliff PLC

(57) ABSTRACT

A connection plate for a continuum arm robotic, the connection plate having a collar for connecting to a continuum arm robot and a cut out section from one end and which extends to a plurality of apertures that are present within a face of the connection plate. A continuum arm robot including a robotic arm and a connection plate wherein the robotic arm includes a connection plate that connects to the end of the distal end of the continuum arm robot through a collar, the connection plate having a cut out section that extends from one end into a plurality of apertures that the distal end of the tendons passes through.

10 Claims, 7 Drawing Sheets

(56) References Cited

U.S. PATENT DOCUMENTS

| | | |
|---|---|---|
| 2019/0201134 A1 | 7/2019 | Diolaiti et al. |
| 2021/0052336 A1 | 2/2021 | Mampetta et al. |
| 2022/0134541 A1 | 5/2022 | Hong et al. |
| 2023/0191630 A1* | 6/2023 | Norton .................. B25J 18/00 74/490.01 |
| 2024/0189983 A1* | 6/2024 | Harrison ................. B25J 9/065 |

FOREIGN PATENT DOCUMENTS

| | | | |
|---|---|---|---|
| CN | 115256362 A | | 11/2022 |
| EP | 4091775 A1 | | 11/2022 |
| GB | 2606727 A | | 11/2022 |
| KR | 10-2021-0103739 A | | 8/2021 |
| WO | 02/16995 A2 | | 2/2002 |
| WO | 2010/001124 A2 | | 1/2010 |

OTHER PUBLICATIONS

May 17, 2023 Search Report issued in British Patent Application No. 2217437.9.
U.S. Appl. No. 18/384,099, filed Oct. 26, 2023 in the name of Liam D. Harrison et al.
Apr. 24, 2024 Extended Search Report issued in European Patent Application No. 23206011.1.
Apr. 24, 2024 Extended Search Report issued in European Patent Application No. 23206012.9.

\* cited by examiner

CONNECTION PLATE

This specification is based upon and claims the benefit of priority from UK Patent Application Number 2217437.9 filed on 22 Nov. 2022, the entire contents of which are incorporated herein by reference.

BACKGROUND

Field of the Disclosure

The disclosure relates to a connection plate for a continuum arm robot. The disclosure further relates to a continuum arm robot having a connection plate to allow it to attach to an actuator pack.

Background of the Disclosure

Continuum arm or snake arm robots are of growing interest in a number of different and divergent fields of technology. They may be used, for example, in the inspection and repair of complex systems such as gas turbine engines or nuclear reactors, or alternatively they can be used in surgical operations on the human body. The benefit of the system is the control that is provided using a compliant arm, which means it can access areas which would be difficult or dangerous for a human to enter without potential significant damage to the surrounding areas. Continuum arm robots comprise an arm, which consists of a number of joints, the stiffness of which can be set when the robot is built. These joints with their desired stiffness provide the robot with the requisite strength and flexibility to perform its desired task. The joints are typically manipulated by tendons which run through the joint and can be tensioned or relaxed as required by an operator. The operator controls the degree of tensioning within the arm through the use of actuators coupled to tendons that run through the robot arm. Each continuum arm robot is provided with its own actuator pack, which contains all the individual actuators that are used for controlling the arm and the head that is attached to the arm. The head provides the tooling or inspection equipment as required for the desired process.

In use a plurality of continuum robots may be required to complete the requisite task. This is because the robots may need different heads if the task is a complex process or alternatively, they may require different stiffness of the joints. This requirement for having a plurality of different continuum arm robots increases the cost and complexity of the process, as each step a different continuum arm robot needs configuring and once the process is completed it needs to be removed and the next continuum arm robot needs to be configured.

Or if the robots need changing this increases the processing time that is required for the process. This, therefore, increases the cost through the requirements of possessing several different continuum arm robots and their associated actuator packs and the operator time in changing and setting up the different continuum arm robots. It is therefore desirable to improve the operation of the continuum arm robots and their actuators.

SUMMARY OF THE DISCLOSURE

According to a first aspect of the disclosure there is provided an actuator pack for a continuum arm robot, the actuator pack comprising a plurality of actuator pack sections, with each section having a housing and an interface plate, each section further containing a bank consisting of a plurality actuators that are connected to their own respective drive electronics and the actuators being mounted to the housing or the interface plate and having their drive heads exposed through a hole in the interface plate, and wherein the sections of the actuator pack are configured to coupled together in one state.

Each actuator pack section may contain the electronic circuitry to control the drive electronics for the actuators such that each actuator pack section can operate as an individual actuator pack.

The actuator packs sections may share the electronic circuitry to control the electronic circuitry to drive the actuators within the actuator pack sections.

The actuator pack sections may be provided with ventilation.

The actuators may be mounted as a plurality actuator pairs within the actuator pack sections.

The actuator pairs may comprise two actuators mounted to frames that are coupled to the housing of the actuator pack sections.

The actuator pack sections may be permanently coupled together.

The actuator pack sections can be fastened together in an off state by non-permanent means and may be configured to be separated for use in a working state.

The actuator pack sections may have location features to assist in joining the actuator pack sections in the closed state.

According to a second aspect of the disclosure there is provided a continuum arm robotic system comprising an actuator pack according to the first aspect, and a continuum arm robot coupled to at least one of the actuator pack sections in its working state, wherein the continuum arm robot comprises a number of deformable joint sections that are actuated by tendons which are connected to the joints at their distal ends and are connected to the actuators at their proximal ends.

The interface plate may be provided with a collar that connects to the arm of the robot.

The interface plate may be provided with a cut out section that extends from an end of the interface plate and has a passage that extends to each of the actuators for running the tendons of the robot trough.

The robotic arm may comprise a connection plate that connects to the end of the distal end of the continuum arm robot, the connection plate having a cut out section that extends from one end to a number of apertures that the distal end of the tendons pass through, and wherein the connection plate is configure to align with the actuator pack section such that when the connection plate is connected to the actuator pack section the apertures of the connection plate align with the actuators within the actuator pack section.

The connection plate may be provided with fastening means to connect it with the actuator pack section.

The connection plate may be configured to have apertures on at least two faces and wherein the actuator pack comprises at least two actuator pack sections whose actuators couple to the distal ends of the tendons at the apertures of the connection plate.

A rotatable plate may be located within the plurality of apertures, the rotatable plate being attached to an axle that is connected to the connection plate, and wherein the tendon associated with the aperture is connected to the plate.

The plate may be provided with a trench around its periphery, and wherein the tendon sits within the plate.

The rotatable plate may be further coupled to the connection plate by a sprung clutch.

According to a third aspect of the disclosure there is provided a connection plate for a continuum arm robotic, the connection plate having a collar for connecting to a continuum arm robot and a cut out section from one end and which extends to a plurality of apertures that are present within a face of the connection plate.

According to a fourth aspect of the disclosure there is provided a continuum arm robot comprising a robotic arm and a connection plate wherein the robotic arm comprises a connection plate that connects to the end of the distal end of the continuum arm robot through a collar, the connection plate having a cut out section that extends from one end into a plurality of apertures that the distal end of the tendons passes through.

The cut out section may be a trench or a slot.

The connection plate may comprise a brake contained within the cut out section and that when activated clamps the tendons in position, so the tension of the tendons within the robotic arm does not change.

A rotatable plate may be located within the plurality of apertures, the rotatable plate being attached to an axle that is connected to the connection plate, and wherein the tendon associated with the aperture is connected to the plate.

The plate may be provided with a trench around its periphery, and wherein the tendon sits within the plate.

The rotatable plate may be further coupled to the connection plate by a sprung clutch.

The plate may be coated with a coating having a higher coefficient of friction than the material of the plate.

The opposite face of the plate to the connection with the axle may have a protrusion or cut away section that is shaped to engage with the head of an actuator.

The collar may further comprise a protection collar that extends from the collar and prevents bending of the robot arm within the vicinity of the collar.

Apertures may be provided on more than one face of the connection plate.

According to another aspect of the disclosure there is provided a continuum arm robotic system comprising a continuum arm robot according to the fourth aspect, and at least an actuator pack having a plurality of exposed actuator heads, and wherein the apertures of the connection plate align with the actuators of the actuator pack and the tendons are coupled to the actuators.

The connection plate and actuator pack may be provided with alignment features that correspond to each other to locate the connection plate on the actuator pack.

The actuator pack and connection plate may be coupled together by non-permanent fasteners.

The connection plate may have apertures on more than one face and wherein an actuator pack is connected to each face of the connection plate that has apertures extending from it.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
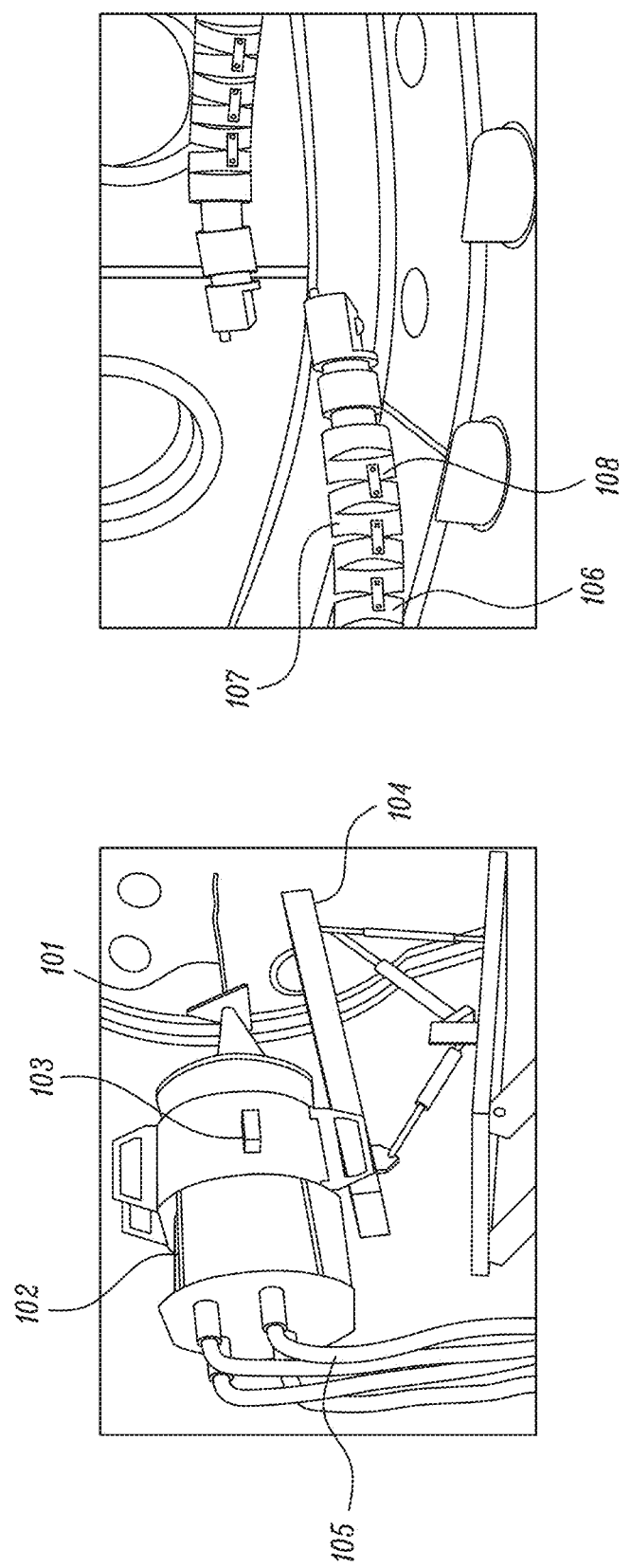
FIG. 1a presents a cut away example of an actuator for a continuum arm robot according to the prior art.
FIG. 1b presents an image of a prior art continuum arm robot in use.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint; this, allows the continuum arm to bend. The actuator pack is shown being positioned on a rail or support 104, which is positioned close to the component that is to be inspected. The actuator is also provided with a plurality of power and signal cables 105 that are used to power and address the actuators. The individual signals across the range of actuators provide control of the joints such that the continuum arm 101 can be directed. Not shown in FIG. 1, is that there is also a need for an operator with a computing device that is linked to the actuator to control movement of the continuum arm and to perform the desired task. As the continuum arm robot is permanently integrated into the actuator pack a complete separate set up is required if the process requires that the tool is changed. This increases the operating cost for the application. The computing device that is connected to the prior art actuator may be any suitable computing system such as a laptop computer featuring the requisite operating software for the robot and a control input such as a joystick, which allows the continuum arm to be controlled.

FIG. 1b shows an example of the joints of a continuum arm robot. The arm comprises multiple joints, which require at least 2 cables per joint. For example, a system having three joints, each having 4 tendons per joint will require 12 actuators to drive the arm. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to be able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets the characteristics of the robot such as the minimum bending radius and the torque that is required to cause a resultant change of angle within the joint. At the end of the arm there is positioned a tool or probe that is designed to perform one or more functions once the continuum arm is in position. The heads of the continuum arm robots are often provided with optical systems so that the operator is able to view the head as it is being inserted into the component and to be control the head as it performs its tasks. The optical system is also frequently coupled to an illumination system. The control cables for the tool, electrical power connectors to the illuminations system and optical cables are usually able to run through the centre of the joints within the continuum arm. This has the benefit of protecting the cables form any potential damage. All of these components as well as the arm structure are permanently coupled to the actuator; this means that if the arm fails or has a problem the entire continuum arm robot needs to be replaced.

Figure 2:
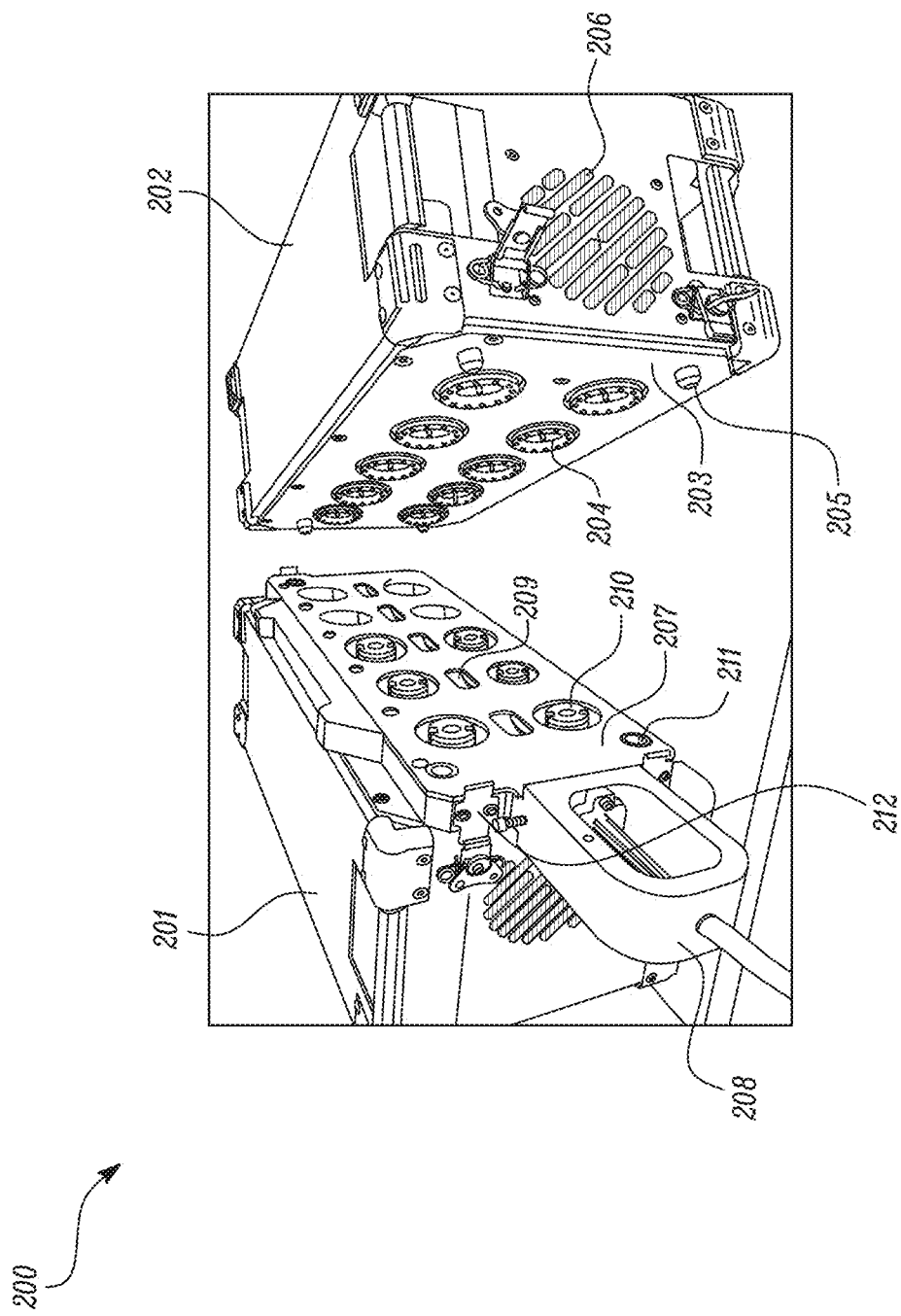
FIG. 2 presents an example of an actuator pack according to the present disclosure.

Continuum or snake arm robots are thus very useful and versatile tools that can be used within a number of inspection, repair and maintenance tasks for complex equipment in which conventional techniques cannot be used. However, issues arise with the current set up in which all continuum robots are either permanently connected to the actuator and as such multistep processes need a number of robots. Alternatively, the robots can undergo a lengthy process of removing the continuum robot from the actuator and then reconnecting a different continuum arm robot. FIG. 2 presents an example of an actuator pack 200 according to the present disclosure. In FIG. 2 the actuator pack is constructed of two sections 201 and 202. Although the example is presented with two sections, there could be any suitable number of actuator sections. For example, there may be 2, 3, 4, 5 actuator pack sections. Each section of the actuator pack may be a closed container with an interface plate 203 positioned on the joining faces of the sections of the actuator pack. Alternatively, the interface plates may be outward facing with a divider positioned though the middle of the actuator pack. Inside the actuator pack sections are the actuators 204 for driving the tendons of the robot and the requisite drive electronics and controllers associated with the drive electronics. The actuators may be mounted within paired banks on both sections of the actuator pack sections. The actuators may be mounted to frames that hold the actuator pairs in position with the frames fastened to the actuator pack sections. The figure shows the actuator sections each having a bank of 5 actuator pairs. However, the actuator pack may have any suitable number of actuator pairs. The actuators need not be mounted in pairs but can be set up in any reasonable configuration. This could be individually or in banks of integer numbers. The outside walls of the actuator pack sections may be made from any suitable material. This may be a metallic material such as aluminium. Alternatively, it may be made from a plastic or composite material. The sections may also be made from a hybrid of plastics or composite and metallic materials. The sections may be hinged together with a fastener at one end to hold them in place. Alternatively, they may have a connecting or locating means 205 at one end and fasteners to hold them together. The casing of the two sections may be provided with ventilation, so that cooling air can flow to the actuators. Ventilation 206 may be aided by providing the actuator sections with a fan to force cooling air onto the electronic components within the actuator pack. The interface plates are the part of the actuator pack sections that are open to the actuators. The interface plates can be made from any suitable material. The interface plates may be made from a metallic material. Alternatively, they may be made from a composite or plastic material. The interface plates may be provided with complimentary positioning features to ensure that the two sections of the actuator pack engage accurately. The interface plates may have a channel within them allowing for the passage of the tendons of the continuum robot to the actuators. By providing the interface plates with a channel it protects the tendons from damage. This channel may be a trench with a cover that can be placed over the trench to protect the tendons once they are fastened to the actuators. This channel also allows for the two sections of the actuator pack to close together accurately, such that the robot arm is securely held within the channel between the two interface plates: thus, allowing for accurate operation of the robot. The end of the actuator packs may be provided with a resilient collar that fixes the robot to the actuator pack and allows for a small amount of movement of the robot but prevents damage to the robot arm at the point that it connects with the actuator pack. Alternatively, as shown in FIG. 2 a connection plate 207 replaces the need to have a channel within the interface plates. The connection plate is shown provided with a collar 208. However, the collar is an optional extra. The connection plate may be permanently connected to the continuum robot and acts as the interface between the robot and the actuator pack to allow for a quick connection and change of continuum arm robot. A channel or trench 209 is provided within the connection plate; this allows for the tendons to pass through the connection plate. The connection plate may also be provided with a number of connectors 210 that are attached to the end of the tendons. The connectors are provided with coupling means for attachment with the drive actuators. The connection plate may also be provided with location features 211 that couple with the interface plate to ensure that the connection plate is correctly positioned relative to the actuators so that the robot can be driven accurately and safely. The connection plate is shown having latches 212 that allow the connection plate and the sections of the actuator pack to ensure a secure connection. The fasteners may be hook and cam fasteners or screws or bolts with corresponding a threaded hole within the connection plate. Other fastening means would be apparent to the person skilled in the art.

The actuators are outwardly facing on the actuator pack with the connectors facing the interface plate. The continuum arm robot may be connected to the actuators directly or through the use of the connecting plate. Directly connected may be performed by using a slot and inserting the tendon through and securing it to an actuator directly. Alternatively, this may be through the use of a slot through which the tendon passes on the actuator, or the use of a coupling disc on the end of the tendon which is has a centre that is shaped to connect with the head of the actuator. The actuators may be any suitable actuator. For example, the actuator may be provided with one or more of the following: a static torque transducer which can provide torque feedback for measuring tendon loads, a high accuracy encoder on the output shaft to measure displacement; a high gear ratio gearbox; a load cell conditioner; and/or a motor controller.

For example, these may be off bespoke actuators or custom actuators. In particular, the actuator may be a packaged integrated system, that includes: torque transducer, Brushless DC motor, harmonic drive gearbox, motor drive, load cell signal conditioner, dual high accuracy rotary encoders, static brake, bearings and housing. The control of the actuator may have an error of less than 0.5 mm in the movement of the tendon. Preferably this is less than 0.3 mm. The force feedback and force control may be within 2% of the rated load. In particular this force feedback and the force control may be within 1% of the rated load. The actuator may have a maximum rotational speed of less than 100 rpm. Preferably the maximum rotational speed is less than 75 rpm. The actuators can be driven by a programmable logic controller and connected via ethercat. The actuators can be driven in either position control mode or torque control mode. In either mode they also supply data to the control system including current position and current torque. The actuator pack may have the interface plates on the outside of the case with the split for the sections being in the middle. If this is the case a cover may be provided for the interface plates for when the actuator pack is transported. Alternatively, the pack may be hinged along one of the edges to be permanently connected. Each section of the actuator pack sections may have all the electronics and computing processors to be able to operate as an independent actuator pack capable of driving a robot arm itself. Alternatively, the actuator packs share some of the electronics between them and the hinges also contain electrical connections to provide the power and signals between the two sections. Each actuator pack section may also be able to control its own continuum arm robot. This may be useful in situations in which two processes are required, or in which a second robot is required to support the first robot. Alternatively, the two sections are used to control the same robot. The actuator packs may be able to change between the two modes of operation, either controlling one robot or controlling two robots. If two robots are used, they may either be manually connected to the actuator bank or through use of interface plates for each robot. The actuator pack sections are configured to be coupled together in at least one state. This coupling together may be in operation or in transport. If in transport the sections can be separated on site and used to perform their own robotic tasks separately.

Figure 3B:
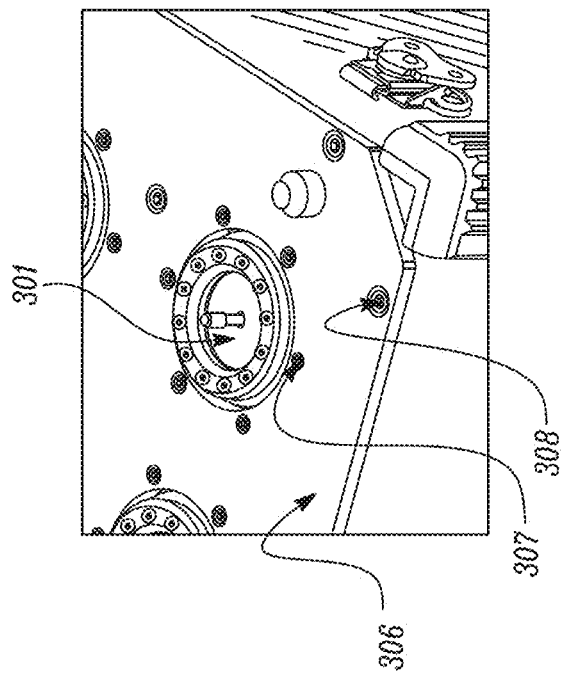
FIG. 3b presents an example of the interface plate according to the present disclosure.
Figure 3A:
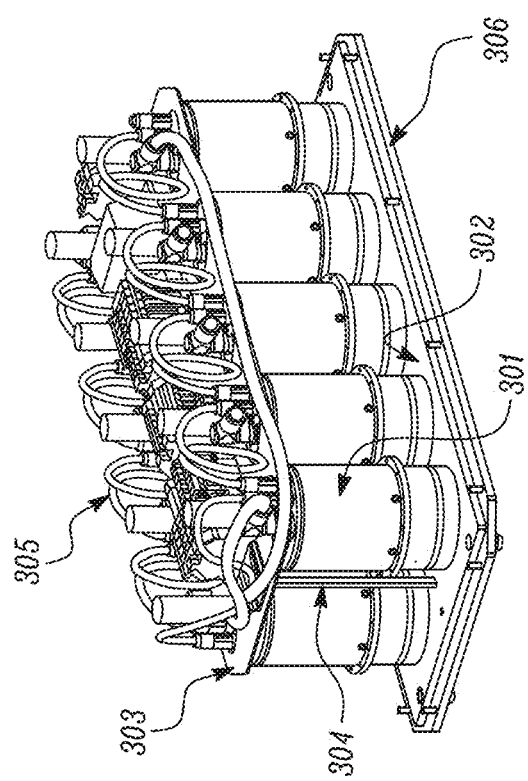
FIG. 3a presents an example of the mounting of the actuators without the housing according to the present disclosure.

FIG. 3a presents an example of the mounting of the actuators without the housing section. In this the actuators 301 are mounted in 5 banks of 2 onto a base plate. The base plate 302 is machined to fit within the housing section. The mounting base plate is connected to an upper plate 303 with a connector bar 304. The actuators are shown to be connected in series using cables 305. The mounting base plate, the top plate and the connector bar may be made out of any suitable material. For example, this may be a metallic material or a plastics material. In the example shown the mounting base plate is connected to the interface plate 306. FIG. 3b presents an example of the interface plate 306 around one of the actuators 301. The actuators are bolted into the mounting frame and the interface plates using bolts 307 The interface plate may also be bolted to the housing using bolts 308.

Figure 4:
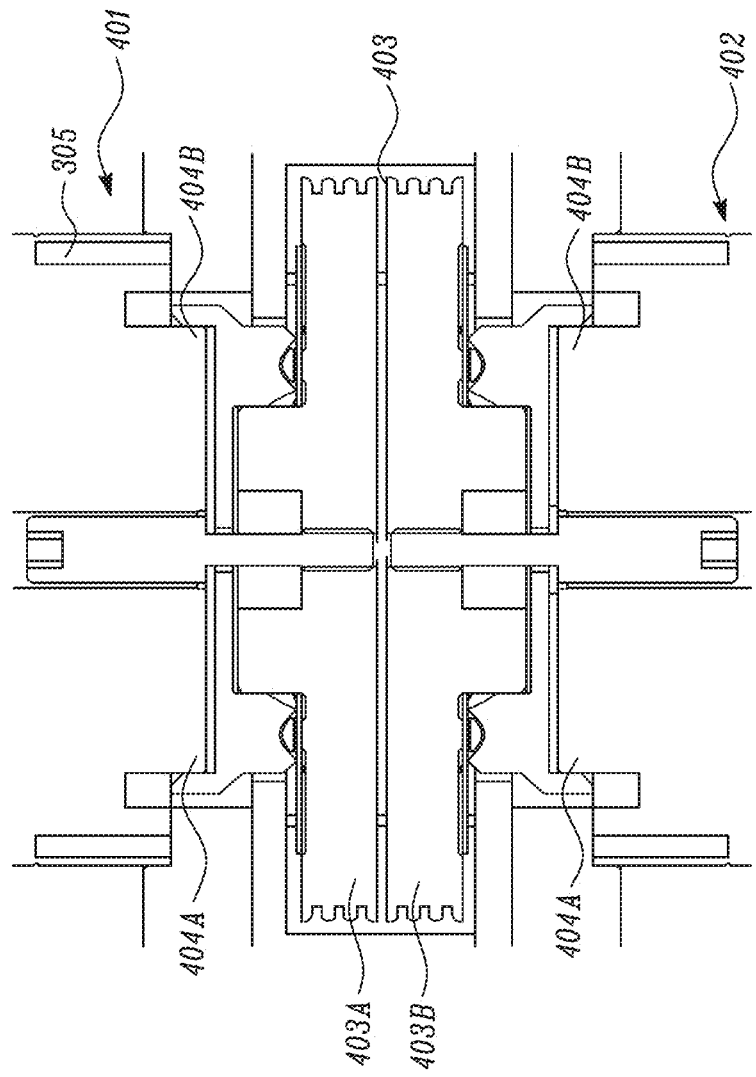
FIG. 4 presents an example of a cross section of the actuator pack according to the present disclosure.

FIG. 4 presents a cross section of the actuator pack of the present disclosure. In this the first 401 and second sections 402 of the actuator pack are in this case connected together. In this example the connection plate 403 sits between the two sections of the actuator pack. In the actuator pack the pairs of actuators 404a,b on both the first and second sections of the actuator are shown. The actuators are mounted to a frame 405 that connects and holds them and the electronics in place. The frame is connected to the housing in the two sections. The secure connection of the actuators within the actuator pack means that the actuator pack is easily and safely transportable and can be taken to the location of the work easily. The rotary section of the actuator is connected to the coupling means. The connecting plate is shown having two sides 403a,b that connect with the two sections of the actuator pack. In each of the halves is the two connection surfaces which connect with the heads of the actuators. The connection surfaces are connected to the tendons running through the connection plate.

The actuator pack is connected to a suitable computer. The connection may be physical via a cable or via wireless communication. The computer requires a processor and memory for running a program that can be used by the operator to control the actuator pack. Through this control the operator is able to control the movement of the continuum arm robots. The operator may be able to interface with the computer using an input system. This may be button controls, a keyboard, a mouse, touchscreen or via a joystick or similar input tool. The computer may be a laptop, desktop or tablet computer system. The operation of the actuator may be performed remotely, so the operator is not present with the actuator pack. If this is so, the actuator pack may have an internet access card connected to the controllers of the computers within the actuator pack. The software may calculate a model of the robotic arm movement using a kinematic model. Using the model the software is able to determine the flexation required at each of the joints and can calculate the movement of the actuator that is required to change the angle of the joint in order to obtain the deformation of the continuum arm. This signal is transmitted to the actuator pack controller.

Figure 5:
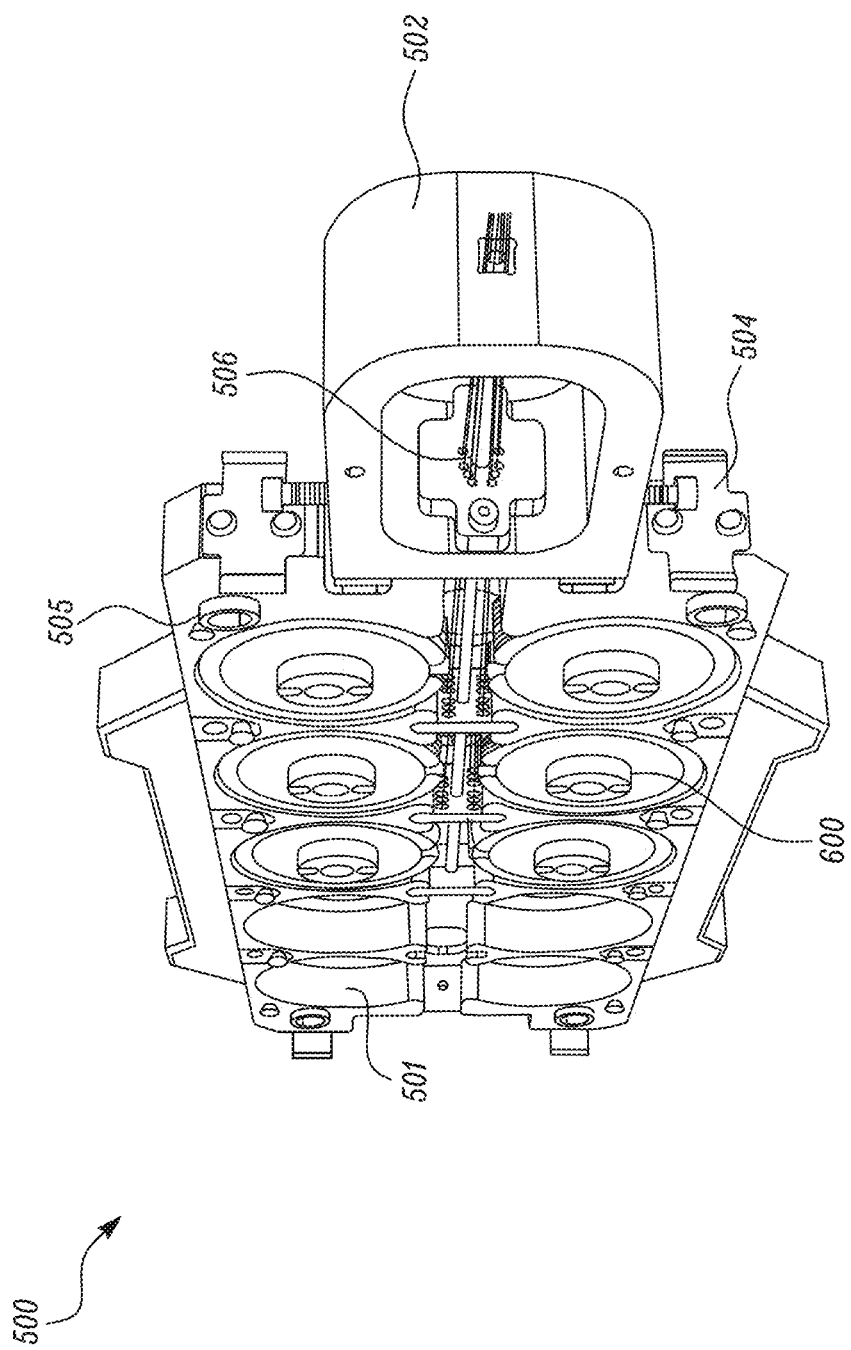
FIG. 5 presents an example of a connection plate for attaching the continuum arm to the actuator pack of the present disclosure.

FIG. 5 presents an example of the connection plate 500 for the actuator pack. The connection plate may be permanently fixed to the end of the robot arm and allows for quicker changes of the robot to the actuator pack. The connector plate may be provided with apertures 501 to allow the tendons to easily access the actuators within the actuator pack. The connection plate may be provided with a protection collar 502 that extends from the connection plate and protects the end of the continuum arm robot from being damaged close to the connection point with the actuator body. Thus, this increases the durability of the continuum robots. The protection collar may be open or may be closed. The protection collar may be provided with a hole through which the continuum robot or the tendons extending from it can be threaded so that the tendons can be fed into the connection plate. The tendons of the actuator may be then be fed into a channel, trench or slot within connection plate. The apertures may be provided with sprung clutch plates 600 that are connected to the tendons. The connector on the connection plate is the part that couples with the head of the actuator. This may be a shaped portion that is designed to engage with the head of the actuators of the actuator pack. The connector plates may have two banks of apertures or holes. These may be provided on either side of the connection plate so that they can be connected to an actuator pack half on both sides. Alternatively, they may be mounted next to each other, so that the actuator pack sections may be mounted next to each other. The connection plate may be connected to the actuator pack sections using fasteners or other non-permanent connection means 504. The fasteners may be bolts or screws. Alternatively, the connection means may be a clamp having a lever to pull them together. The connection plates may have alignment features 505 on them.

The alignment features ensure that the connection plate is accurately mounted on the actuator pack. It also ensures that the holes or apertures of the connection plate align with the position of the actuator so that the connector if present can couple with the actuator. The connection plate may be provided with a slot 506 or channel running through it. The slot or channel allows the tendons of the continuum robot to pass through the connection plate. The channel may also extend to the apertures, so the tendons are able to be protected from the collar or end of the interface plate to the actuators. The connection plate may also be provided with tendon brakes. These may be a clamp that is positioned behind the collar within the connection plate. Having these brakes within the connection plates allows for bending of the active or passive sections of a continuum robot during handling, which causes the lengths of the tendons lengths to change, not to affect how tendon length within the connection plate. Bending the robot is inevitable when handling and the slack created in the tendons would be enough to jump out of a spool groove or for the tendon to move within the connection plate meaning a process of removing it. The breaks may be actuated manually operated. Or alternatively, the brakes may be automatically operated when the connection plate is removed from the actuator pack or packs.

Figure 6:
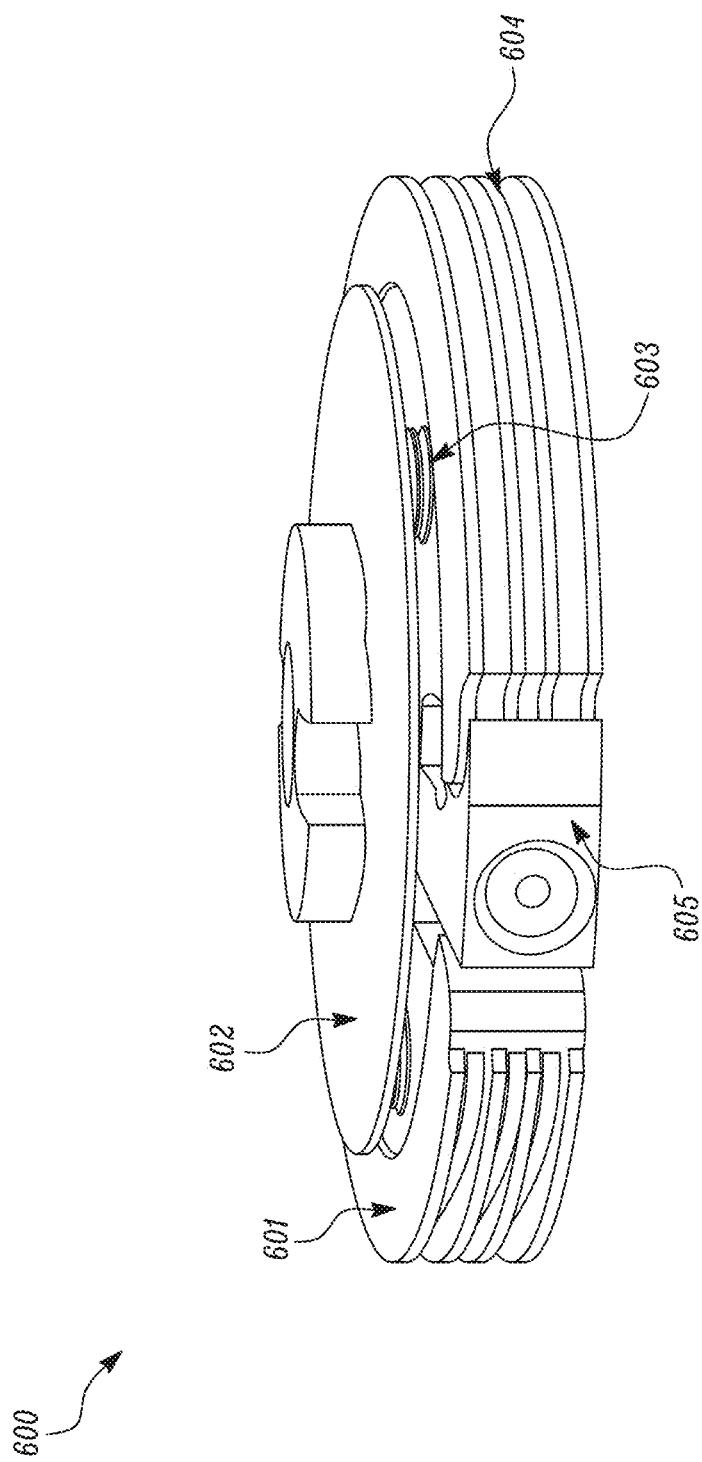
FIG. 6 presents an example of the rotatable plate according to an aspect of the present disclosure.

FIG. 6 presents an example of the rotatable plate according to an aspect of the present disclosure. The rotatable plate 600 has the tendons cables of the robot attached and are mounted to an axle that extends form the connection plate. The rotatable plate 600 has a main plate 601, with a clutch plate 602 which is pushed away from the main plate by the use of springs 603. The clutch plate may utilise between 1 and 6 springs. Preferably, this may be between 2 and 4 springs. The rotatable plate 600 is shown with grooves 604, which allows the tendons to be wound around them. The rotatable plate 600 may also be provided with a reversible clamp 605 that allows the tendon to be released. This may also have a ferrule to secure the end of the tendon cable. With the tendons connected to the rotatable plate 600 the tension in the tendons can be maintained when the robot arm is removed from the actuator pack. The rotatable plate 600 may be provided with a connector to attach to the actuators within the actuator pack sections. In this, the springs push the clutch plate against a side wall of the connection plate and the force generated by springs creates resistance to spool rotation due to friction in contact. This helps maintain the tension within the tendons. The spring clutch plates may be provided with a higher friction coating. This coating on the clutch plate insures a reliable coupling with the actuator.

Figure 7A:
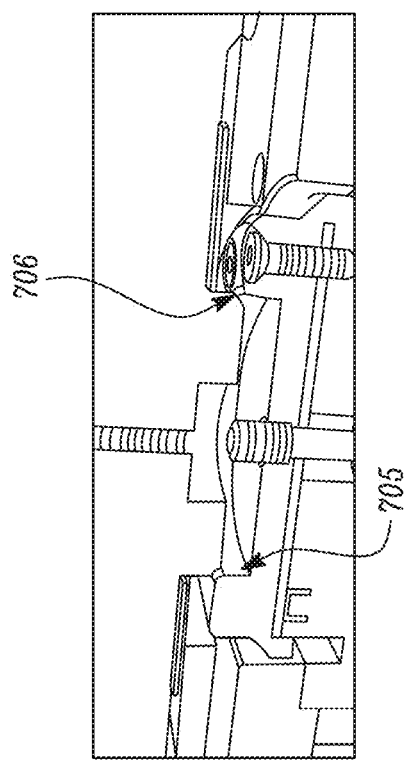
FIG. 7a-d presents an example of the connection process of the rotatable plate to the actuator.
Figure 7B:
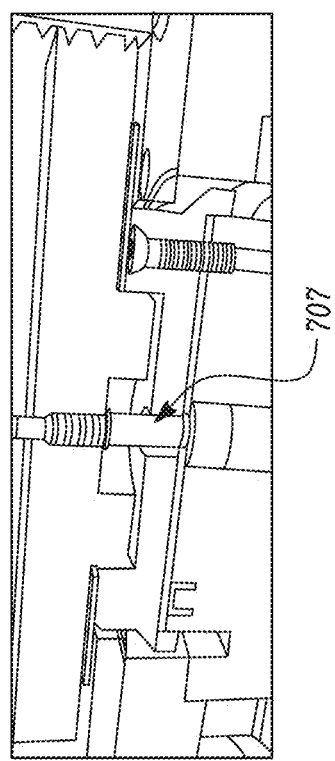
Figure 7C:
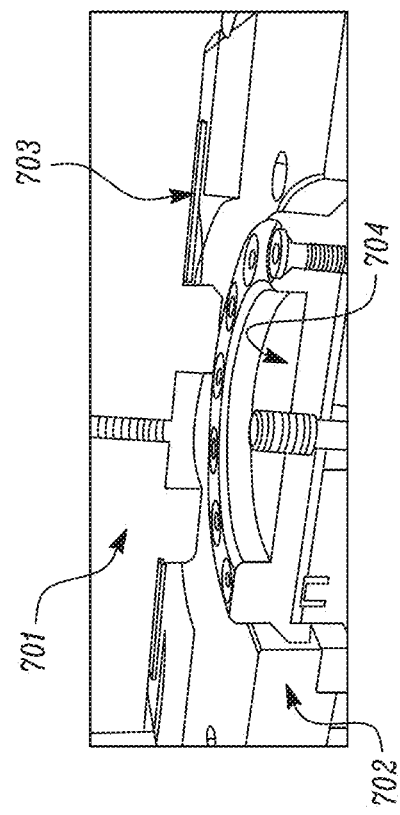
Figure 7D:
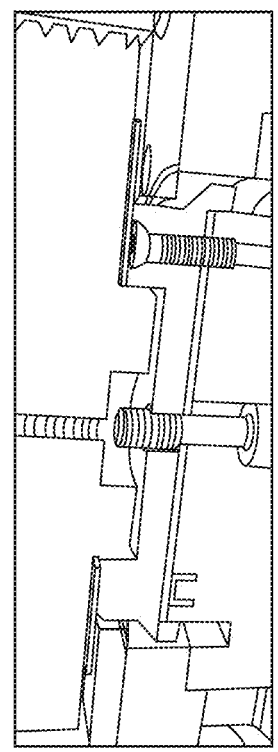

FIG. 7*a-d* presents an example of the connection of the spring clutch plate to an actuator within the actuator pack. In FIG. 7*a* the connection plate 701 is moved towards to the actuator pack 702. The friction plate 703 on this is not connecting with the actuator head 704. In FIG. 7*b* the inside of the actuator spool 705 is aligned with the tendon spool 706 of the actuator on the connection plate. The spools may have a chamfered edge, as shown, to assist in the alignment. In FIG. 7*c* the friction plate is placed in contact with the actuator. In FIG. 7*d* a captive bolt 707 pulls spool home on actuator and provides load for friction-based torque transfer. With this in place the actuator is now able to operate the tendon within the continuum robot. The friction plate on this provides high consistent coefficient of friction for torque transfer. The friction plate may have a coefficient of friction of 0.7. Friction plate on this robot base is pushed away from spool by springs to hold spool in place when not coupled to actuator. To remove the connection plate the captive bolt is released, and the connection plate can be removed from the actuator pack.

It will be understood that the invention is not limited to the embodiments above-described and various modifications and improvements can be made without departing from the concepts described herein within the scope of the following claims.

We claim:

1. A continuum arm robot comprising a robotic arm and a connection plate wherein the connection plate connects to an end of the robotic arm through a collar, the connection plate having a channel that extends from one end into a plurality of apertures that an end of tendons passes through, wherein
   a rotatable plate is located within the plurality of apertures, the rotatable plate being attached to an axle that is connected to the connection plate, and
   a tendon of the tendons associated with the aperture is connected to the rotatable plate.

2. The continuum arm robot according to claim 1, wherein the rotatable plate is provided with a trench around its periphery, and wherein the tendon sits within the rotatable plate.

3. The continuum arm robot according to claim 1, wherein the rotatable plate is coated with a coating having a higher coefficient of friction than the material of the rotatable plate.

4. The continuum arm robot according to claim 1, wherein the opposite face of the rotatable plate to the connection with the axle has a protrusion or cut away section that is shaped to engage with a head of an actuator.

5. The continuum arm robot according to claim 1, wherein the collar further comprises a protection collar that extends from the collar and prevents bending of the robot arm within the vicinity of the collar.

6. The continuum arm robot according to claim 1, wherein apertures are provided on more than one face of the connection plate.

7. A continuum arm robotic system comprising a continuum arm robot according to claim 1, and at least an actuator pack having a plurality of exposed actuator heads, and wherein the apertures of the connection plate align with the actuators of the actuator pack and the tendons are coupled to the actuators.

8. The continuum arm robotic system according to claim 7, wherein the connection plate and actuator pack are provided with alignment features that correspond to each other to locate the connection plate on the actuator pack.

9. The continuum arm robotic system according to claim 7, wherein the actuator pack and connection plate are coupled together by non-permanent fasteners.

10. The continuum arm robotic system according to claim 7, wherein the connection plate has apertures on more than one face and wherein an actuator pack is connected to each face of the connection plate that has apertures extending from it.

* * * * *